(12) United States Patent
Chen

(10) Patent No.: US 9,974,030 B2
(45) Date of Patent: May 15, 2018

(54) SYSTEM AND METHOD FOR IMPLEMENTING POWER DISTRIBUTION

(75) Inventor: Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 1558 days.

(21) Appl. No.: 14/646,543

(22) PCT Filed: Feb. 28, 2011

(86) PCT No.: PCT/US2011/026405
§ 371 (c)(1),
(2), (4) Date: Jul. 8, 2015

(87) PCT Pub. No.: WO2011/112373
PCT Pub. Date: Sep. 15, 2011

(65) Prior Publication Data
US 2015/0319706 A1    Nov. 5, 2015

Related U.S. Application Data

(63) Continuation of application No. 12/884,377, filed on Sep. 17, 2010, now abandoned.
(Continued)

(51) Int. Cl.
| | |
|---|---|
| *H04W 52/20* | (2009.01) |
| *H04W 72/04* | (2009.01) |
| *H04B 7/022* | (2017.01) |
| *H04B 7/06* | (2006.01) |
| *H04W 52/24* | (2009.01) |

(Continued)

(52) U.S. Cl.
CPC ........... *H04W 52/20* (2013.01); *H04B 7/022* (2013.01); *H04B 7/0615* (2013.01);
(Continued)

(58) Field of Classification Search
CPC ................... H04W 52/26; H04L 45/02
See application file for complete search history.

(56) References Cited

U.S. PATENT DOCUMENTS

| | | | |
|---|---|---|---|
| 7,313,113 B1 | 12/2007 | Hills et al. | |
| 2008/0248805 A1* | 10/2008 | Han | H04L 5/0007 455/450 |

(Continued)

OTHER PUBLICATIONS

International Search Report and Written Opinion, Application No. PCT/US2011/026405, 14 pages.

*Primary Examiner* — Zhiren Qin
(74) *Attorney, Agent, or Firm* — Baker Botts L.L.P.

(57) ABSTRACT

A method, in accordance with particular embodiments, includes establishing a plurality of wireless connections with a plurality of endpoints. The connections are established via one or more of a plurality of remote transceivers. The method also includes determining a plurality of candidates for a positive power gain. The plurality of candidates includes a plurality of unique pairings, each pairing comprising a combination of one endpoint and one remote transceiver. The method additional includes identifying a subset of the plurality of candidates. The method further includes determining whether the identified subset results in an optimum power distribution. If the identified subset results in a less than optimum power distribution, the method includes identifying a different subset of candidates. If the identified subset results in an optimum power distribution, the method includes computing a non-uniform power distribution based on the identified subset.

15 Claims, 4 Drawing Sheets

Related U.S. Application Data

(60) Provisional application No. 61/312,415, filed on Mar. 10, 2010.

(51) Int. Cl.
*H04W 52/26* (2009.01)
*H04W 52/40* (2009.01)
*H04W 52/14* (2009.01)
*H04W 52/38* (2009.01)
*H04B 7/155* (2006.01)
*H04W 88/08* (2009.01)

(52) U.S. Cl.
CPC .......... *H04B 7/0617* (2013.01); *H04W 52/24* (2013.01); *H04W 52/241* (2013.01); *H04W 52/267* (2013.01); *H04W 52/40* (2013.01); *H04W 72/0473* (2013.01); *H04B 7/15535* (2013.01); *H04W 52/143* (2013.01); *H04W 52/386* (2013.01); *H04W 88/085* (2013.01); *Y02B 60/50* (2013.01)

(56) References Cited

U.S. PATENT DOCUMENTS

| | | |
|---|---|---|
| 2009/0003468 A1* | 1/2009 | Karabulut ............. H04L 5/0007 375/260 |
| 2009/0061939 A1 | 3/2009 | Andersson et al. |
| 2009/0202020 A1 | 8/2009 | Abdulrauf |
| 2010/0265842 A1* | 10/2010 | Khandekar ....... H04W 72/0433 370/252 |

\* cited by examiner

US 9,974,030 B2

SYSTEM AND METHOD FOR IMPLEMENTING POWER DISTRIBUTION

PRIORITY CLAIM

This application is a U.S. National Stage Application of International Application No. PCT/US2011/026405 filed Feb. 28, 2011, which claims priority to U.S. patent application Ser. No. 12/884,377 filed Sep. 17, 2010, which claims priority under 35 U.S.C. § 119 to U.S. Provisional Patent Application Ser. No. 61/312,415 filed Mar. 10, 2010. The contents of which are incorporated by reference herein in their entirety.

TECHNICAL FIELD OF THE INVENTION

This invention relates in general to wireless networks and, more particularly, to a system and method for implementing power distribution.

BACKGROUND OF THE INVENTION

Distributed antenna systems consist of a base station (also known as a Radio Element Control or a Baseband Unit) and one or more remote transceivers (also known as Radio Elements or Remote Radio Heads). These components provide endpoints with wireless network access. To aid the distributed antenna system in distinguishing between the various wireless transmissions to and from the various endpoints, each endpoint may have one or more unique subcarriers assigned thereto.

Within a distributed antenna system, the remote transceivers are distributed around different geographic locations while being connected via a wired connection (e.g., optical fiber) to the base station. Wile there may be multiple remote transceivers, from the perspective of an endpoint there is only one entity, the base station. That is, each remote transceiver transmits essentially the same core data, and the endpoint combines multiple signals from multiple remote transceivers into a single communication.

The base station communicates with the remote transceivers using, for example, the Common Public Radio Interface (CPRI) standard. The CPRI standard allows in-phase/quadrature (I/Q) data to be transmitted from the base station to the remote transceivers. The remote transceivers use the I/Q data to form the transmissions that are sent to any endpoints connected thereto. The remote transceivers are also able to communicate with the base station using the CPRI standard. This allows the remote transceivers to relay data received from the endpoints and to communicate control information, such as signal quality, to the base station.

SUMMARY

In accordance with a particular embodiment, a method includes establishing a plurality of wireless connections with a plurality of endpoints. The connections are established via one or more of a plurality of remote transceivers. The method also includes determining a plurality of candidates for a positive power gain. The plurality of candidates includes a plurality of unique pairings, each pairing comprising a combination of one endpoint and one remote transceiver. The method additionally includes identifying a subset of the plurality of candidates. The method further includes determining whether the identified subset results in an optimum power distribution. If the identified subset results in a less than optimum power distribution, the method includes identifying a different subset of candidates. If the identified subset results in an optimum power distribution, the method includes computing a non-uniform power distribution based on the identified subset.

Technical advantages of particular embodiments may include determining an optimal power distribution among remote transceivers in a computationally quick manner. Another technical advantage of particular embodiments may include increasing the system capacity by improving the power distribution within a distributed antenna system. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
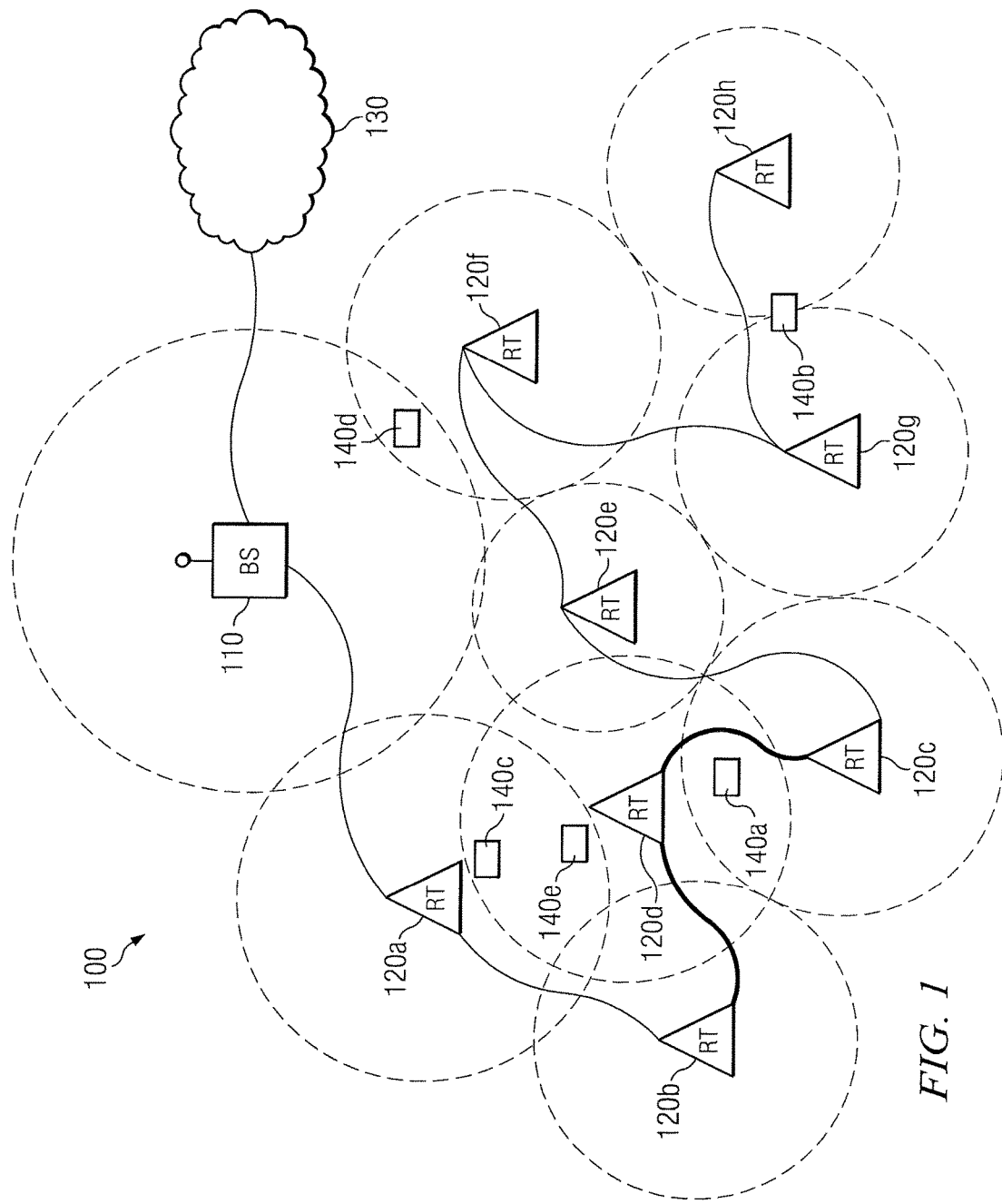
FIG. 1 illustrates a distributed antenna system comprising a base station and a plurality of remote transceivers, in accordance with a particular embodiment.

FIG. 1 illustrates a distributed antenna system comprising a base station and a plurality of remote transceivers, in accordance with a particular embodiment. Distributed antenna system 100 comprises base station 110 and multiple remote transceivers 120. Wireless communications may be transmitted by remote transceivers 120 at varying power levels to different endpoints. For example, more power may be allocated to an endpoint that is closer to a remote transceiver. This may be based on the notion that the benefit of increasing the transmission power to a nearby endpoint is greater than the resulting loss from decreasing the transmission power to a distant endpoint. The power of a particular transmission, comprising one or more subcarriers, from a particular remote transceiver (e.g., remote transceiver 120d) to a particular endpoint (e.g., endpoint 140c) may depend on the signal quality between the particular endpoint and the particular remote transceiver. The transmission power of each subcarrier at each remote transceiver may be greater than or less than a standard power level. The standard power level may be based on an equal distribution of power among the subcarriers (e.g., all transmissions are transmitted with the same power). Increasing or decreasing the transmission power for each endpoint 140 at each remote transceiver 120 may increase the capacity of distributed antenna system 100 as compared to a system utilizing uniform power across all subcarriers.

In certain embodiments, base station 110 may be able to quickly determine an optimum distribution of power for each endpoint 140 at each remote transceiver 120. For example, base station 110 may determine the optimum distribution by solving a convex optimization problem using an intelligent heuristic algorithm that is able to be run in polynomial time. The non-uniform distribution of power to different subcarriers at different remote transceivers may increase the capacity of distributed antennas system 100, as compared to a blanket transmission scheme in a traditional distributed antenna system.

Distributed antenna system 100 may be coupled to network 130 via base station 110. Distributed antenna system 100 may provide wireless coverage for endpoints 140 over a large geographic area. For example, a single base station (e.g., base station 110) and a plurality of remote transceivers (e.g., remote transceivers 120) may be used to provide wireless coverage for an entire building. In distributed antenna system 100, remote transceivers 120 may differ from relay stations in that they have a wired connection to base station 110 as opposed to a wireless connection as used by traditional relay stations. In some embodiments, remote transceivers 120 may comprise reduced intelligence compared to relay stations or base stations. In some embodiments, base station 110 and remote transceivers 120 may together comprise the functionality of a traditional macro base station, wherein base station 110 comprises the logic to manage the wireless connections with endpoints 140 (e.g., assign channels and power levels) and remote transceivers 120 may comprise the components for communicating with the endpoints (e.g., radios, analog-to-digital and digital-to-analog converters). Distributed antenna system 100 may reduce the operational and deployment cost by reducing the radiated power (e.g., spreading remote transceivers 120 over a wide area eliminates the need for a powerful central transceiver to cover the same wide area) and providing deployment flexibility (e.g., remote transceivers 120 may be small in size compared to other types of relay stations, repeaters or macro base stations).

In some embodiments, remote transceivers 120 may be part of a long term deployment plan. For example, when a wireless service provided first brings wireless service to a new area, it may begin by deploying a few macro base stations. Each macro base station may comprise all the features and capabilities needed to provide wireless service within its associated coverage area. When the service provider begins to grow the coverage area, fill in gaps in its coverage area, or respond to increased demand within its coverage area, the service provider may convert one or more of the macro base stations into distributed antenna base stations (e.g., base station 110) and add one or more remote transceivers. The conversion may comprise adding a new module to the macro base station. The wireless service provider may then add additional remote transceivers as needed. Eventually, the wireless service provider may decide to convert the remote transceivers to pico base stations. This may be done by simply adding a module to the remote transceivers and converting the backhaul connections of remote transceivers from CPRI connections to IP connections. This upgrade approach allows a service provide to grow their network in an incremental approach. This may reduce the cost for the wireless service provider and provides greater deployment flexibility compared to traditional deployment techniques of simply adding more macro or pico base stations.

Because remote transceivers 120 are distributed over a geographical area, the distance between an endpoint and each remote transceiver 120 may be different. In particular embodiments, the signal quality between an endpoint and a remote transceiver may generally increase as the endpoint gets closer to the remote transceiver. Particular embodiments may take advantage of this increased signal quality by increasing the transmission power for the subcarriers associated with the signal having the better quality. Because a remote transceiver has a finite amount of transmission power, an increase in power for a particular subcarrier may be balanced by a corresponding decrease in power of another subcarrier. One possible way in which base station 110 may estimate how close an endpoint is to one or more of remote transceivers 120 is to estimate the dominant part of a channel response (e.g., slow fading) associated with the endpoint.

Depending on the embodiment, distributed antenna system 100 may use any of a variety of wireless technologies or protocols (e.g., IEEE 802.16m or 802.16e, or long term evolution (LTE)) for communications between remote transceivers 120 and endpoints 140. The multiple remote transceivers 120 appear to endpoints 140 as a single entity—an extension of base station 110. Thus, each remote transceiver 120 may attempt to send the same core data to endpoints 140 and may potentially receive the same data from endpoints 140. The differences in the data that is sent or received may be the result of the respective distances of each remote transceiver 120 from a particular endpoint and, as will be discussed in more detail below, the amount of power applied to each subcarrier at each remote transceiver.

Depending on the embodiment, distributed antenna system 100 may use any of a variety of different wired technologies or protocols (e.g., CPRI) for communications between remote transceivers 120 and base station 110. In particular embodiments, base station 110 may be configured to adjust the power, either directly (e.g., by incorporating the power distribution in the I/Q samples that are sent to the remote transceivers) or indirectly (e.g., by providing power distribution values to each remote transceiver from which the remote transceivers can determine their respective power distribution), that each remote transceiver applies to its transmissions. By selectively increasing or decreasing the transmission power for particular sub-carriers (associated with particular endpoints) at particular remote transceivers, base station 110 may be able to more efficiently use the available wireless resources.

Depending on the embodiment, base station 110 may use signal quality information from the various remote transceivers to determine the power distribution for each subcarrier for each remote transceiver 120. The signal quality information may include the received uplink power strength, the maximal usable modulation and coding scheme (MCS) level, the carrier to interference-plus-noise ratio (CINR) of the wireless connection, and/or the signal to interference plus noise ratio (SINR) of the wireless connection. In particular embodiments, uplink sounding may be used to estimate the channel gain and interference strength between endpoints 140 and remote transceivers 120.

Network 130 may be any network or combination of networks capable of transmitting signals, data, and/or messages, including signals, data or messages transmitted through WebPages, e-mail, text chat, voice over IP (VoIP), and instant messaging. Network 130 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

Base station 110 may include any combination of hardware, software embedded in a computer readable medium, and/or encoded logic incorporated in hardware or otherwise stored (e.g., firmware) to implement any number of communication protocols that allow for the wireless exchange of packets in distributed antenna system 100. Base station 110 may be configured to determine and distribute a power distribution to each remote transceiver 120. Depending on the embodiment, base station 110 may apply the power distribution to the data before it is sent to the remote transceivers for transmission or base station 110 may allow each remote transceivers 120 to individually apply the power distribution.

Remote transceivers 120 may include any combination of hardware, software embedded in a computer readable medium, and/or encoded logic incorporated in hardware or otherwise stored (e.g., firmware) to implement any number of communication protocols that allow for the wireless exchange of packets with endpoints 140 in distributed antenna system 100. In some embodiments, remote transceivers 120 receive data from base station 110 that may already include the power distribution determinations made by base station 110. In particular embodiments, each remote transceiver 120 may adjust the transmission power of the core data received from base station 110. The adjustments may be made based on one or more control signals sent from base station 110 specifying the transmission power for each sub-carrier, or plurality of sub-carriers, at each respective remote transceiver 120.

Endpoints 140 may comprise any type of wireless device able to send and receive data and/or signals to and from base station 110 via remote transceivers 120. Some possible types of endpoints 140 may include desktop computers, PDAs, cell phones, laptops, and/or VoIP phones. Endpoints 140 may provide data or network services to a user through any combination of hardware, software embedded in a computer readable medium, and/or encoded logic incorporated in hardware or otherwise stored (e.g., firmware). Endpoints 140 may also include unattended or automated systems, gateways, other intermediate components or other devices that can send or receive data and/or signals.

The following example may help illustrate particular features of certain embodiments. For purposes of this example, assume that base station 110 only controls two remote transceivers, remote transceivers 120a and 120d. Further assume that endpoints 140c and 140e are both located in the area served by remote transceivers 120a and 120d. To simplify the scenario, assume that the scheduling algorithm at base station 110 allocates the same number of subcarriers in a frame to each of endpoints 140c and 140e. Further assume that the magnitude of the channel gain between remote transceiver 120a and endpoint 140c is twice that of remote transceiver 120a and endpoint 140e; and that the magnitude of the channel gain between remote transceiver 120d and endpoint 140e is twice that of remote transceiver 120d and endpoint 140c. Based on these assumptions, base station 110 may allocate ⅔ of remote transceiver 120a's power to the subcarriers used by endpoint 140c and ⅓ to the subcarriers used by endpoint 140e (as opposed to the even ½ and ½ distribution of a standard distributed antenna system). Similarly, base station 110 may allocate ⅔ of remote transceiver 120d's power to the subcarriers used by endpoint 140e and ⅓ to the subcarriers used by endpoint 140c.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 2:
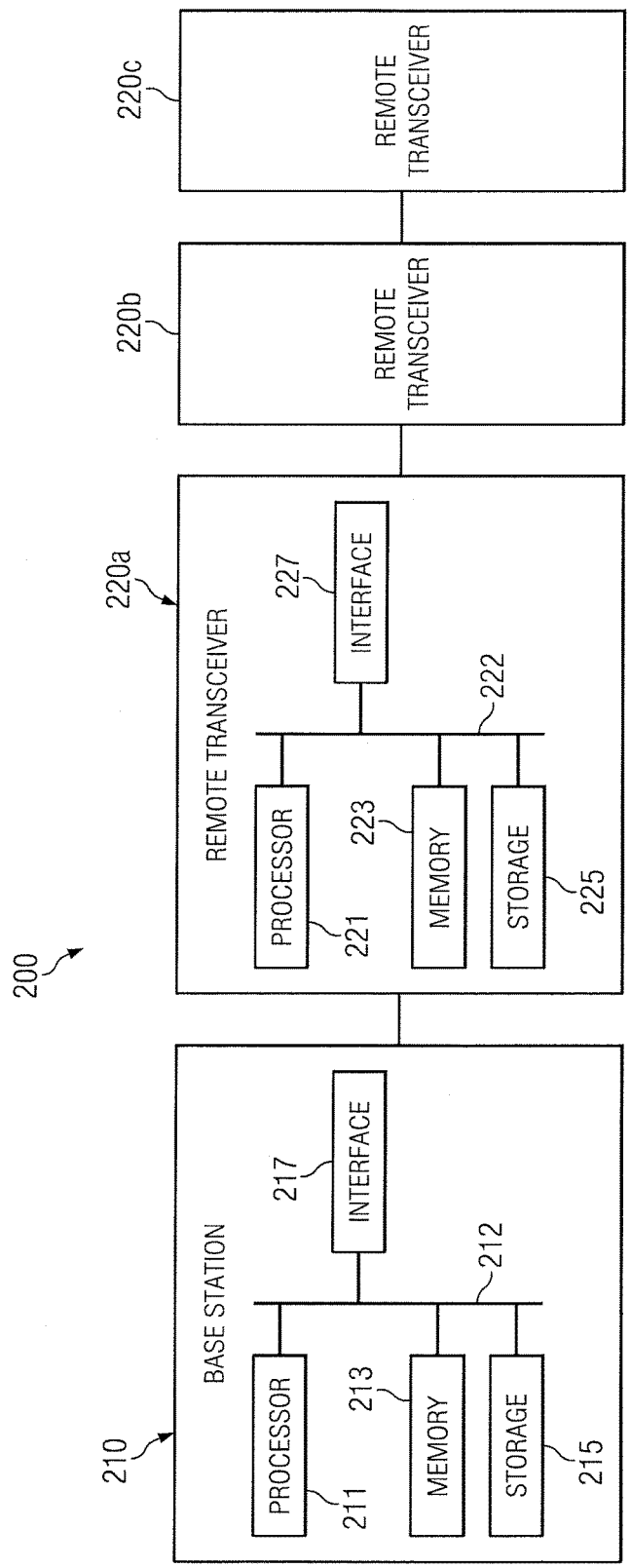
FIG. 2 illustrates a detailed block diagram of a base station and a remote transceiver within a distributed antenna system, in accordance with a particular embodiment.

FIG. 2 illustrates a detailed block diagram of a base station and a remote transceiver within a distributed antenna system, in accordance with a particular embodiment. Distributed antenna system 200 may be used with any of a variety of different wireless technologies, including, but not limited to, orthogonal frequency division multiple access (OFDMA), next generation wireless system such as LTE-A and 802.16m.

Distributed antenna system 200 includes base station 210 and remote transceivers 220. Base station 210 and remote transceivers 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 210 and remote transceiver 220 may comprise any suitable physical form, configuration, number, type and/or layout. As an example, and not by way of limitation, base station 210 and/or remote transceiver 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 210 and/or remote transceiver 220 may include one or more computer systems; be unitary or distributed; span multiple locations; span multiple machines; or reside in a cloud, which may include one or more cloud components in one or more networks.

Where appropriate, distributed antenna system 200 may perform without substantial spatial or temporal limitation one or more steps of one or more methods described or illustrated herein. As an example, and not by way of limitation, distributed antenna system 200 may perform in real time or in batch mode one or more steps of one or more methods described or illustrated herein. One or more distributed antenna systems may perform at different times or at different locations one or more steps of one or more methods described or illustrated herein, where appropriate.

In the depicted embodiment, base station 210 and remote transceiver 220 each include their own respective processors 211 and 221, memory 213 and 223, storage 215 and 225, interfaces 217 and 227, and buses 212 and 222. These components may work together to provide a distributed antenna system in which the power distribution for each endpoint at each remote transceiver 220 is distributed based on a relative signal quality for each endpoint at each remote transceiver. Although a particular distributed antenna system is depicted having a particular number of particular components in a particular arrangement, this disclosure contemplates any suitable distributed antenna system 200 having any suitable number of any suitable components in any suitable arrangement. For simplicity, similar components of base station 210 and remote transceiver 220 will be discussed together wherein the components of remote transceiver 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) wireless networking functionality. Such functionality may include providing various wireless features discussed herein. For example, processor 211 may determine how to allocate power for each sub-carrier at each remote transceiver 220. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. Memory 213 (and/or 223) may store any suitable data or information utilized by base station 210 (and/or remote transceiver 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. As an example and not by way of limitation, base station 210 may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

Bus 212 (and/or 222) may include any combination of hardware, software embedded in a computer readable medium, and/or encoded logic incorporated in hardware or otherwise stored (e.g., firmware) to couple components of base station 210 (and/or remote transceiver 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses, as described below. In particular embodiments, one or more memory management units (MMUs) may reside between processor 211 (and/or 221) and memory 213 (and/or 223) and facilitate accesses to memory 213 (and/or 223) requested by processor 211 (and/or 221). In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate.

In particular embodiments, storage 215 (and/or 225) may include mass storage for data or instructions. As an example and not by way of limitation, storage 215 (and/or 225) may include an HDD, a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to base station 210 (and/or remote transceiver 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between base station 210, remote transceivers 220, any endpoints (not depicted) being serviced by base station 210, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such embodiments, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. The power distribution for the radio signal may have been determined and applied to each subcarrier at base station 210, or the power distribution may be determined at base station 210 and applied by remote transceivers 220. Similarly, the radios may convert radio signals received via the antenna into digital data to be processed by, for example, processor 211 (and/or 221). In some embodiments, base station 210 may process the data by, for example: Determining the received power from each endpoint at each remote transceiver 220; generating a power matrix comprising 1's and 0's based on the received power; solving linear equations based on the power matrix; comparing the result of the solution to a previous result; if the result (e.g., the value of the objective function) is an improvement checking if the solution of the linear equations provides an acceptable solution to the Karuch-Kuhn-Tucker (KKT) optimality conditions; if the if the solution of the linear equations provides an acceptable solution, determining the power distribution based on the solution of the linear equations; and if the result is not an improvement or the solution of the linear equations does not provide an acceptable solution to the KKT conditions, generating a new power matrix based on the received power.

Depending on the embodiment, interface 217 (and/or 227) may be any type of interface suitable for any type of network for which distributed antenna system 200 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 200 may communicate with a wireless PAN (WPAN) (such as, for example, a BLUETOOTH WPAN), an OFDM network, a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 (and/or remote transceivers 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and base station 210 (and/or remote transceivers 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more device or encoded software drivers enabling processor 211 (and/or 221) to drive one or more of these I/O devices. Interface 117 (and/or 227) may include one or more interfaces 117 (and/or 227), where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a tangible, non-transitory computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The components and devices illustrated in FIG. 2 form distributed antenna system 200. From the perspective of an endpoint, distributed antenna system 200 may appear as a single base station. An endpoint may be unable to distinguish between a wireless transmission sent by remote transceiver 220a and a wireless transmission sent by remote transceiver 220b. The channel experienced by an endpoint is the sum of the channel responses from each of remote transceivers 220.

In particular embodiments, base station 210 may communicate with remote transceivers 220 using Common Public Radio Interface (CPRI). The CPRI specification supports a variety of topologies, including ring, tree, star, and chain topologies. The CPRI specification allows multiple remote transceivers 220 to be controlled by the same base station 210. In some embodiments, a CPRI link may be used by base station 210 to send/receive different in-phase/quadrature (I/Q) data to/from each different remote transceivers 220. For example, in some embodiments, base station 210 may apply the power distribution locally. This may result in each remote transceiver needing its own unique I/Q sample. In particular embodiments, the CPRI link may be used to send/receive a single set of I/Q samples from remote transceivers 220. For example, in some embodiments the power distribution may be applied individually at each respective remote transceiver. This may allow a single I/Q sample to be used by all remote transceivers 220.

The allocation of power to different subcarriers at different remote transceivers 220 for different endpoints in the power distribution may be based on the signal quality (e.g., the received power) associated with communications sent from each endpoint and received at each remote transceiver 220. In particular embodiments, base station 210 may allocate more power to those endpoints having better channel quality at each respective remote transceiver. Depending on the embodiment, there may be at least three components used to determine channel response: path loss, shadowing, and multipath. In contrast with shadowing and multipath effects (which are often random processes) path loss is the most dominant component in the channel response. Path loss may be a function of the distance between an endpoint and a remote transceiver. The closer an endpoint is to a particular remote transceiver, the higher the channel gain is between the endpoint and the remote transceiver. In distributed antenna system 200, the varying distances between an endpoint and each remote transceiver 220 may result in varying path losses and channel gains between remote transceivers 220 a particular endpoint.

In particular embodiments, the closer an endpoint is to a remote transceiver, the greater the power that will be allocated to the subcarriers associated with the endpoint. Conversely, the farther an endpoint is from a remote transceiver, the less power that will be allocated to subcarriers associated with the endpoint. This may allow each remote transceiver 220 to more efficiently use their available transmission power. The non-uniform power distribution to different subcarriers could enhance the signal to interference-plus-noise ratio (SINR) at the endpoint by increasing the received signal strength from the closer remote transceivers 220 while the loss of signal strength due to the reduced power from a more distant remote transceiver may be insignificant.

In particular embodiments, each remote transceiver 220 may measure the average received power of the subcarriers allocated to each endpoint. This information may then be delivered to base station 210 over a CPRI control channel. Base station 210 may use the measured uplink power to approximate the downlink channel response between each remote transceiver 220 and the endpoints. This estimation may be used by base station 210 to determine the power distribution which base station 210 may then send to remote transceivers 220 using the CPRI control channel.

In some embodiments, each remote transceiver 220 may send their own respective I/Q data along with I/Q data received from the upstream remote transceiver. Base station 210 may use the individual I/Q samples to estimate the received downlink power at the endpoint (e.g., it may be proportional to the determined uplink power). Using this estimated power, base station 210 may determine and apply an amount of amplification or attenuation to the download signal. This may be done without adjusting the phase of the download signal. The amplified data may then be sent to remote transceivers 220 as individual I/Q data.

In certain embodiments, before base station 210 allocates the distribution of power, it may first execute a scheduling algorithm to allocate subcarriers within a channel to the different endpoints. Once the subcarriers have been assigned, base station 210 may use the measured uplink power received from remote transceivers 220 to redistribute the downlink power to maximize system capacity. Depending on the embodiment and/or scenario, base station 210 could use any of a variety of strategies to apply power distribution. For example, base station 210 may be able to determine an optimum power distribution by applying KKT optimality conditions with the following optimization formula:

$$\max_{\{G_{rn}\}} f(\vec{G}) = \sum_{m=1}^{N_M} S_m \cdot \ln\left(1 + \sum_{r=1}^{N_R} K_{rm} \cdot G_{rm}\right)$$

$$\text{s.t.} \sum_{m=1}^{N_M} S_m \cdot G_{rm} = N$$

$$\forall r = 1, \ldots, N_R$$

$$G_{rm} \geq 0$$

$$\forall r = 1, \ldots, N_R; m = 1, \ldots, N_M$$

in which: (1) $S_m$ may represent the number of subcarriers allocated to endpoint m; (2) $G_{rm}$ may represent the power amplification factor at remote transceiver r for all the subcarriers allocated to endpoint m; (3) $K_{rm}$ may represent the indicator of signal quality which may be proportional to the power received by remote transceiver r from endpoint m; (4) N may represent the number of subcarriers in a channel; (5) $N_R$ may represent the number of remote transceivers controlled by base station 210; and (6) $N_M$ may represent the number of the endpoints which are scheduled by base station 210 to receive data in one frame.

In certain embodiments, base station 210 may use the following Lagrangian function of the optimization problem in determining an optimum power distribution:

$$L(\vec{G}, \vec{\lambda}, \vec{\mu}) = \sum_{m=1}^{N_M} -S_m \ln\left(1 + \sum_{r=1}^{N_R} K_{rm} G_{rm}\right) + \sum_{r=1}^{N_R} \lambda_r \left(\sum_{m=1}^{N_M} S_m G_{rm} - N\right) - \sum_{r=1}^{N_R} \sum_{m=1}^{N_M} \mu_{rm} G_{rm}$$

in which $\mu$ and $\lambda$ are Lagrangian coefficients.

In certain embodiments, the equations associated with the KKT optimality conditions may be expressed as follows:

$$\frac{\partial L}{\partial G_{rm}} = 0 \Rightarrow \sum_{j=1}^{N_R} K_{jm} G_{jm} - \frac{S_m \cdot K_{rm}}{S_m \cdot \lambda_r - \mu_{rm}} = -1 \quad \text{(KKT 1)}$$

$\forall r = 1, \ldots, N_R; m = 1, \ldots, N_M$ $$\sum_{m=1}^{N_M} S_m \cdot G_{rm} = N \quad \text{(KKT 2)}$$

$\forall r = 1, \ldots, N_R$ $$G_{rm} \geq 0 \quad \text{(KKT 3)}$$

$\forall r = 1, \ldots, N_R; m = 1, \ldots, N_M$ $$\mu_{rm} \cdot G_{rm} = 0 \quad \text{(KKT 4)}$$

$\forall r = 1, \ldots, N_R; m = 1, \ldots, N_M$ $$\mu_{rm} \geq 0 \quad \text{(KKT 5)}$$

$\forall r = 1, \ldots, N_R; m = 1, \ldots, N_M$

The variables in equations KKT 1 through KKT 5 include $G_{rm}$, $\lambda_r$, and $\mu_{rm}$ in which the number of variables are $(N_R \cdot N_M)$, $N_R$, and $(N_R \cdot N_M)$, respectively ($N_R$ may represent the number of remote transceivers and $N_M$ may represent the number of endpoints which are scheduled by base station 210 to receive data in one frame). Thus, the total number of variables in the KKT optimality condition equations may be $(2 \cdot N_R \cdot N_M + N_R)$. Fortunately, there also exist $(2 \cdot N_R \cdot N_M + N_R)$ KKT optimality equations in KKT 1, 2, and 4. By solving these three sets of equations, it may be possible to find a global optimal solution.

Particular embodiments, may avoid the time and/or computational cost of solving the non-linear equation of KKT 1 and 4, by using an intelligent heuristic algorithm to transform KKT 1 and 4 into a linear problem that may be solved in a greedy manner. When $G_{rm}$, the power amplification factor of endpoint m at remote transceiver r, is positive the corresponding Lagrangian multiplier, $\mu_{rm}$, is equal to zero (see e.g., KKT 4). Then, KKT 1 may be simplified as a linear equation of $\{G_{jm}\}_{j=1 \sim N_R}$ and the inverse of the Lagrangian multiplier, $\lambda_r$:

$$\sum_{j=1}^{N_R} K_{jm} G_{jm} - \frac{K_{rm}}{\lambda_r} = -1$$

If it is assumed that the set of the positive power amplification gain, $\{G_{rm} > 0\}$, is known, the KKT optimality conditions equations can be transformed into linear equations: $A \cdot X = B$, where:

1) X is a $(N_R \cdot N_M + N_R) \times 1$ column vector, $$X = (G_{11}, \ldots, G_{N_R 1}, G_{12}, \ldots, G_{N_R 2}, \ldots, G_{1 N_M}, \ldots, G_{N_R N_M}, 1/\lambda_1, \ldots, 1/\lambda_{N_R})^T$$

2) A is a $(N_R \cdot N_M + N_R) \times (N_R \cdot N_M + N_R)$ square matrix. Its $((y-1) \cdot N_R + x)$-th row corresponds to the equation of $G_{r=x, m=y}$ in KKT 1. If $G_{xy}$ is greater than zero, the $((y-1) \cdot N_R + x)$-th row vector is:

$$\left[ \underbrace{0 \; 0 \; \ldots \; 0}_{(y-1) \cdot N_R \, 0s} \; K_{1y} \; \ldots \; K_{N_R y} \; \underbrace{0 \; 0 \; \ldots \; 0}_{(N_M - y) \cdot N_R \, 0s} \; \underbrace{0 \; 0 \; \ldots \; 0}_{(x-1)} \; -K_{xy} \; 0 \; \ldots \; 0 \right]$$

On the other hand, if $G_{xy}$ is equal to zero, the $((y-1) \cdot N_R + x)$-th row vector of the matrix A can be simply the row vector with all elements equal to zero except the $((y-1) \cdot N_R + x)$-th element which may be equal to one $$\left( \text{e.g.,} \; \left[ \underbrace{0 \; 0 \; \ldots \; 0 \; 0}_{(y-1) \cdot N_R + (x-1) \, 0s} \; 1 \; 0 \; \ldots \; 0 \right] \right).$$

The $(N_R \cdot N_M + r)$-th ($r = 1 \sim N_R$) row vector of the matrix A may correspond to an equation in KKT 2. The $(N_R \cdot N_M + 1)$-th to $(N_R \cdot N_M + N_R)$-th row vectors can presented as a concatenation of a series of $N_M$ scalar matrices and a zero matrix:

$$[a_{ij}]_{i = N_R \cdot N_M + 1, \ldots, N_R \cdot N_M + N_R; j=1, \ldots, N_R \cdot N_M + N_R} = (S_1 \cdot I_{N_R}, \ldots S_{N_M} \cdot I_{N_R}, 0_{N_R})$$

where $I_{N_R}$ is the $N_R \times N_R$ identity matrix.

3) B is a $(N_R \cdot N_M + N_R) \times 1$ column vector. Its $((y-1) \cdot N_R + x)$-th element, $B_{(y-1) \cdot N_R + x}$, is equal to $-1$ if $G_{xy}$ is greater than zero; otherwise, $B_{(y-1) \cdot N_R + x}$ is equal to zero. The $(N_R \cdot N_M + 1)$-th to $(N_R \cdot N_M + N_R)$-th elements of the vector B may all be equal to N.

In certain embodiments, the elements of the matrices A and B may depend on the selection of positive power amplification gain. Thus, base station 210 may select a subset of combinations from among all the possible combinations of endpoints and remote transceivers before transforming the KKT equations into linear equations. However, it may not be desirable to try every possible combination because the total number of possible combinations may grow exponentially. Rather, certain embodiments may use an intelligent heuristic algorithm to identify the candidates of the positive power amplification gain in a greedy manner.

In certain instances, the algorithm may begin by searching for an initial set $\{G_{rm}\}$ of pairings with positive power amplification gain. Each pairing may represent a combination of one endpoint and one remote transceiver. For example, if there were two endpoints in the depicted embodiment, there would be six pairings ((2 endpoints)*(3 remote transceivers)=6 pairing). Based on the equality constraint in KKT 2, for each remote transceiver r, there exists at least one positive power amplification gain, $G_{rm} > 0$, assigned to an endpoint m. In certain embodiments and/or scenarios, pairings having a higher received power (e.g., higher $K_{rm}$ value as discussed below) may result in a higher objective value. The objective value may be derived from the objective function which may be designed to distribute power so as to maximize the overall system capacity. Thus, certain embodiments may, for each remote transceiver, select the pairing having the highest received power. Moreover, to ensure that each endpoint has at least some positive power amplification gain for at least one remote transceiver, base station 210 may, for each endpoint that is not included in any of the initially selected pairings, determine the pairing having the greatest received power.

In some embodiments, the indicator of signal quality, which may be proportional to the received power, may be computed as $$K_{rm} = \frac{c \cdot P_{rm}^{UL}}{N_T \cdot \sigma_n^2}$$

where c may represent a constant used to calibrate the differences between the transmitting and receiving antenna gains of downlink and uplink connections; $P_{rm}^{UL}$ may represent the average of the received uplink power of a subcarrier allocated to the m-th endpoint at the r-th remote transceiver; $N_T$ may represent the number of the transmitting antennas at each remote transceiver; and $\sigma_n^2$ may represent the variance of the noise power per subcarrier.

After determining the initial set of positive power gain $\{G_{rm}>0\}$, the matrices A and B may be determined and used to solve linear equations of A*X=B. The solution to X may be a potential solution of the optimization problem, $\{G_{rm}\}$. This potential solution may be compared with a previous solution to determine whether the value of the objective function is improved. If the value of the objective function, based on the potential solution, is an improvement over the previous solution, then the potential solution may be accepted for the possible final solution. The potential solution may then be tested to determine if it satisfies the KKT optimality conditions (e.g., KKT 1-5).

In certain embodiments, the Lagrangian multiplier, $\mu_{rm}$ can be computed as:

$$\mu_{rm} = S_m \cdot \left( \lambda_r - \frac{K_{rm}}{1 + \sum_{j=1}^{N_R} K_{jm} G_{jm}} \right)$$

Then a check may be made to determine if the set of the complete solution $\{G_{rm}, \lambda_r, \text{ and } \mu_{rm}\}$ satisfies the KKT condition equations by computing one or more individual error values based on:

$$Error_{rm} = \sum_{j=1}^{N_R} K_{jm} G_{jm} - \frac{S_m \cdot K_{rm}}{S_m \cdot \lambda_r - \mu_{rm}} + 1$$

$$\forall r = 1, \ldots, N_R; m = 1, \ldots, N_M$$

If all $Error_{rm}$ values are below a tolerance threshold then the solution satisfies the KKT optimality condition equations and may be considered a global optimal solution.

On the other hand, if one or more $Error_{rm}$ values exceed the tolerance threshold then the potential solution may not be considered to be the optimal solution since it does not satisfy the KKT conditions. If this occurs, then the next candidate for a positive power gain is determined to improve the objective value.

In some embodiments, a heuristic approach may be used to determine the next candidate pairing of positive $G_{xy}$ from the descending order of $\{K_{rm}\}_{r=1 \sim N_R, m=1 \sim N_M}$. In certain embodiments, before the next candidate is considered, a potential next candidate may be tested to determine if it will increase the result of the objective function without solving the converted linear equations. For example, the potential next candidate $G_{xy}$ may be used improve the objective value if the following inequality holds:

$$\frac{K_{xy}}{1 + \sum_{j=1}^{N_R} K_{jy} G_{jy}} > \frac{K_{xm}}{1 + \sum_{j=1}^{N_R} K_{jm} G_{jm}} \forall \text{ any } G_{xm} > 0$$

Once the next candidate has been determined, both matrices A and B may be updated. The $((y-1) \cdot N_R + x)$-th row of the matrix A may be replaced by the row vector $$\left[ \overset{(y-1) \cdot N_R \, 0s}{0 \; 0 \; \ldots \; 0} \; K_{1y} \; \ldots \; K_{N_R y} \; \overset{(N_M-y) \cdot N_R \, 0s}{0 \; 0 \; \ldots \; 0} \; \overset{(x-1)}{0 \; 0 \; \ldots \; 0} \; -K_{xy} \; 0 \; \ldots \; 0 \right]$$

while the $((y-1) \cdot N_R + x)$-th element in vector B may be changed from 0 to −1. The new solution may be obtained by solving the linear equations based on the updated matrices A and B.

The above algorithm may be repeated until either a solution is found that satisfies the KKT optimality conditions or the last candidate with the smallest received power (e.g., the smallest $K_{rm}$) is evaluated. In the worst case, there may be at most $(N_R \cdot N_M)$ iterations. The computing time in each iteration may be based on spending at most $O(N_R^2 \cdot N_M^2)$ in solving linear equations. Therefore, the complexity of the proposed algorithm may be $O(N_R^3 \cdot N_M^3)$.

Once base station 210 has determined how to allocate the downlink power for the various subcarriers at each remote transceiver 220, the power distribution may be applied either at base station 210 or at remote transceivers 220. For example, in some embodiments, base station 210 may generate I/Q data for each remote transceiver 220 that includes the core data modified by the power distribution (this may be done in the frequency domain before base station 210 performs Inverse Discrete Fourier Transform (IDFT) operations). As another example, in some embodiments, base station 210 may send the core data and power distribution information separately. For example, the core data may be sent via the CPRI data link, and the power distribution information may be sent via the CPRI control session. This may allow each remote transceiver 220 to apply the power distribution locally. This may further allow base station 210 to send the same (frequency-domain) data to each remote transceiver 220 thereby reducing the data rate needed for the CPRI link.

Thus far, several different embodiments and features have been presented. Particular embodiments may combine one or more of these features depending on operational needs and/or component limitations. This may allow for great adaptability of distributed antenna system 200 to the needs of various organizations and users. Some embodiments may include additional features.

Figure 3A:
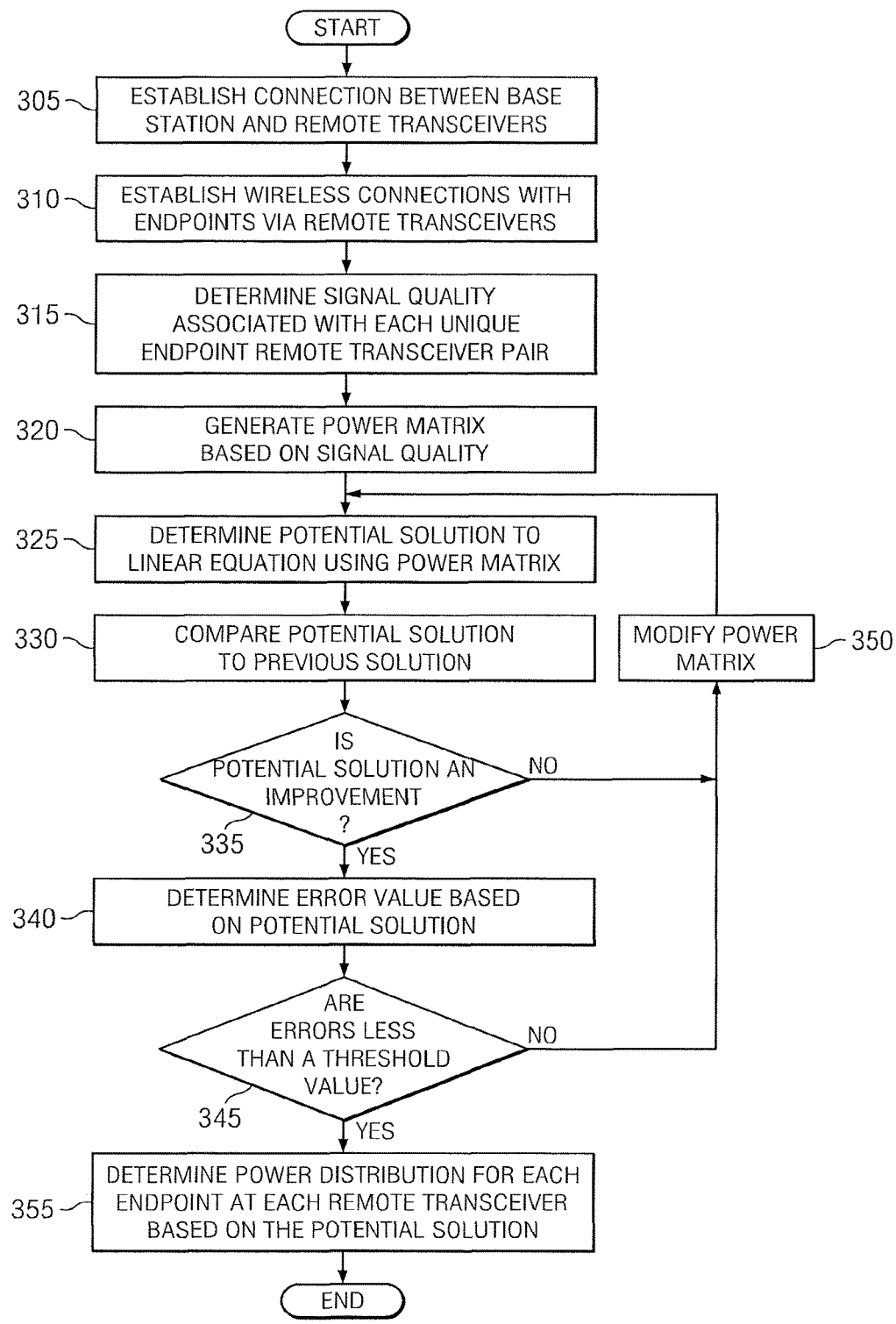
FIG. 3A illustrates a method for implementing power distribution within a distributed antenna system, in accordance with a particular embodiment.

FIG. 3A illustrates a method for implementing power distribution, in accordance with a particular embodiment.

Figure 3B:
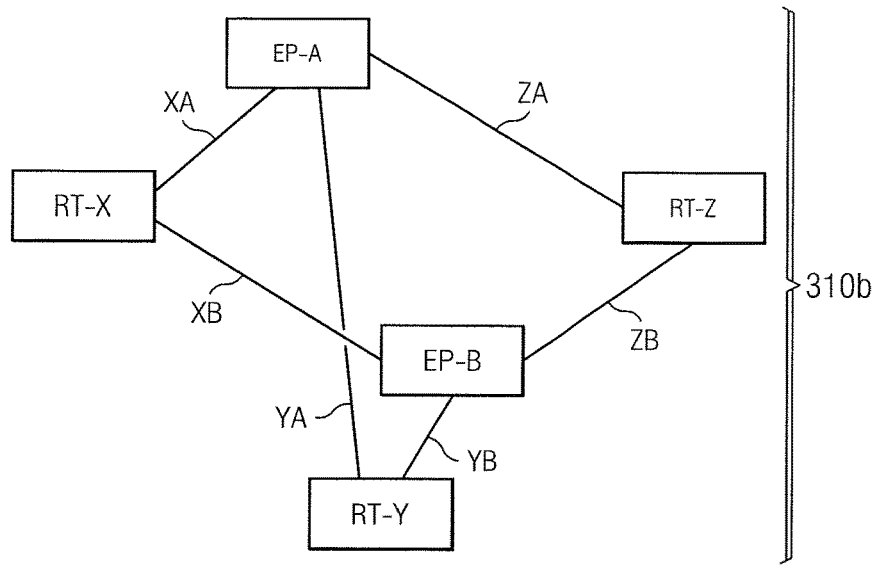
FIG. 3B illustrates several sample models to help illustrate corresponding steps in the method depicted in FIG. 3A, in accordance with a particular embodiment.

FIG. 3B illustrates several sample models to help illustrate corresponding steps in the method depicted in FIG. 3A, in accordance with a particular embodiment. The sample models depicted in FIG. 3B are numbered to correspond to a respective step in the method depicted in FIG. 3A. For example, the signal quality matrix depicted in model 315b corresponds to step 315. For purposes of simplicity, the illustrated steps of the method for the depicted embodiment are from the perspective of a base station. The base station is responsible for managing a plurality of remote transceivers in a distributed antenna system.

The method begins at step 305 with the establishment of connections between a base station and a plurality of remote transceivers. In some embodiments the connection between the base station and the plurality of remote transceivers may comprise a Common Public Radio Interface connection. At step 310 a plurality of wireless connections are established with a plurality of endpoints. The wireless connections are established via one or more of the plurality of remote transceivers. While each endpoint, from its perspective, may have established a single wireless connection with a single base station, each endpoint may actually be sending and receiving communications from a number of remote transceivers. It may be helpful to think of these connections as pairings. A pairing may represent a connection between one remote transceiver and one endpoint.

Model 310b depicts a scenario in which wireless connections are established with two endpoints (EP-A and EP-B) via three remote transceivers (RT-X, RT-Y, and RT-Z). This configuration results in six unique pairings (XA, XB, YA, YB, ZA, and ZB). More specifically, there are two pairings (one for each of endpoints (EP-A and EP-B) associated with each of the three remote transceivers (RT-X, RT-Y, and RT-Z).

At step 315 a signal quality is determined for each unique pairing. Each signal quality indication may comprise information from which the base station may be able to determine the relative quality, strength, and/or efficiency of a wireless connection between the respective remote transceiver and the respective endpoint. For example, if a particular remote transceiver is able to receive a signal from two endpoints, the signal quality indication sent from the particular remote transceiver would include information regarding the relative quality, strength, and/or efficiency of a wireless connection with both of the two endpoints. In certain embodiments, the signal quality indication may be based on the received power. That is, the signal quality associated with pairing XA may be based on the received power of a communication from EP-A received by RT-X. Model 315b illustrates an R by M sized signal quality matrix, $K_{RM}$, in which R is the number of remote transceivers (three) and M is the number of endpoints (two). The values provided are to aid in the example and do not necessarily represent actual signal quality values or received power values.

At step 320 a power matrix is generated based on the determined signal quality. The power matrix may comprise the same dimensions as the signal quality matrix. In certain embodiments, the power matrix may be initialized to all 0s. This is shown in model 320b-1. Next, for each remote transceiver, the endpoint having the highest received power is noted as a 1 in the corresponding element of the power matrix. This is shown in model 320b-2. In particular, endpoint EP-A has the best signal at each of the three remote transceivers. Next, for each endpoint that has not been assigned any positive power gain, the remote transceiver with the best signal for that endpoint is noted as a 1 in the corresponding element of the power matrix. In model 320b-2 it can be seen that there are no is for endpoint EP-B, thus a 1 is noted for the ZB pairing because the signal from endpoint EP-B is best received at remote transceiver RT-Z. This is shown in model 320b-3.

At step 325 a potential solution is determined to linear equations using the power matrix. In some embodiments, the linear equation may be of the form A*X=B, where the solution for X is the potential solution. As discussed in more detail below, A and B may be formed based on the power matrix and the signal quality for each pairing.

A is a $(N_R \cdot N_M + N_R) \times (N_R \cdot N_M + N_R)$ square matrix (9×9 in FIG. 3B). Its $((y-1) \cdot N_R + x)$-th row corresponds to the equation of $G_{r=x,m=y}$ in KKT 1. If $G_{xy}$ is greater than zero, the $((y-1) \cdot N_R + x)$-th row vector is:

$$\left[ \begin{array}{ccccc|ccc|ccccc} \overbrace{0\ 0\ \ldots\ 0}^{(y-1) \cdot N_R 0_s} & K_{1y} & \ldots & K_{N_R y} & \overbrace{0\ 0\ \ldots\ 0}^{(N_M-y) N_R 0_s} & \overbrace{0\ 0\ \ldots\ 0}^{(x-1)} & -K_{xy} & 0 & \ldots & 0 \end{array} \right].$$

On the other hand, if $G_{xy}$ is equal to zero, the $((y-1) \cdot N_R + x)$-th row vector of the matrix A can be simply the row vector with all elements equal to zero except for the $((y-1) \cdot N_R + x)$-th element equal which may be equal to one $$\left( e.g., \left[ \overbrace{0\ 0\ \ldots\ 0\ 0}^{(y-1) \cdot N_R + (x-1) 0_s}\ 1\ 0\ \ldots\ 0 \right] \right).$$

The $(N_R \cdot N_M + r)$-th $(r=1 \sim N_R)$ row vector of the matrix A may correspond to an equation in KKT 2. The $(N_R \cdot N_M + 1)$-th to $(N_R \cdot N_M + N_R)$-th row vectors may be presented as a concatenation of a series of $N_M$ scalar matrices and a zero matrix:

$$[a_{ij}]_{i=N_R \cdot N_M+1,\ldots,N_R \cdot N_M+N_R; j=1,\ldots,N_R \cdot N_M+N_R} = (S_1 \cdot I_{N_R},\ldots,S_{N_M} \cdot I_{N_R}, 0_{N_R})$$

where $I_{N_R}$ is the $N_R \times N_R$ identity matrix. For simplicity, the value of the number of subcarriers assigned to each endpoint is represented by the letter Q and elements of the $(N_R \cdot N_M + 1)$-th to $(N_R \cdot N_M + N_R)$-th row are represented in matrix A in model 325b.

B is a $(N_R \cdot N_M + N_R) \times 1$ column vector. Its $((y-1) \cdot N_R + x)$-th element, $B_{(y-1) \cdot N_R + x}$, is equal to −1 if $G_{xy}$ is greater than zero; otherwise, $B_{(y-1) \cdot N_R + x}$ is equal to 0. The $(N_R \cdot N_M + 1)$-th to $(N_R \cdot N_M + N_R)$-th elements of the vector B may all be equal to N, the number of subcarriers in a channel.

Once A and B have been defined, the equation A*X=B may be solved for X. X is a $(N_R \cdot N_M + N_R) \times 1$ column vector, $$X = (G_{11}, \ldots, G_{N_R 1}, G_{12}, \ldots, G_{N_R 2}, \ldots, G_{1 N_M}, \ldots, G_{N_R N_M}, 1/\lambda_1, \ldots, 1/\lambda_{N_R})^T,$$

where $N_R$ is the number of remote transceivers (three in FIG. 3B) and $N_M$ is the number of endpoints (two in FIG. 3B). The resulting X may comprise the solution of power gains for each pair of remote transceiver and endpoint (indicated as G above) and Lagrangian multipliers (indicated as λ above). The value of the objective function may be computed based on the solution of power gains. At step 330 the potential solution is compared to a previous solution to determine if the potential solution is an improvement. In certain embodiments, the comparison may be between the determined objective function and a previously determined objective function. At decision step 335, if the potential solution is an improvement over the previous solution the method continues to step 340, otherwise the method continues to step 350.

At step 350 the power matrix is modified. The modification may comprise updating the entry of one or more pairings in the power matrix. The updated entry may correspond to the next best signal determined from among the signals that have not already been identified. For example, the value associated with pairing XB in the power matrix may be updated to 1 because pairing XB has a better signal than pairing YB. In some embodiments, the power matrix may be modified by including a pairing that satisfies the following conditions:

$$\frac{K_{xy}}{1+\sum_{j=1}^{N_R} K_{jy} G_{jy}} > \frac{K_{xm}}{1+\sum_{j=1}^{N_R} K_{jm} G_{jm}} \forall \text{ any } G_{xm} > 0$$

At step 340 one or more error values may be determined based on the potential solution. The error values may be determined using the following equation:

$$Error_{rm} = \sum_{j=1}^{N_R} K_{jm} G_{jm} - \frac{S_m \cdot K_{rm}}{S_m \cdot \lambda_r - \mu_{rm}} + 1$$

$$\forall r = 1, \ldots, N_R; m = 1, \ldots, N_M.$$

At decision step 345, if one or more of the resulting $Error_{rm}$ values are greater than a threshold value, then the method proceeds to step 350 (discussed above); if the $Error_{rm}$ values are below the threshold, then the method proceeds to step 355. If the $Error_{rm}$ values are below the threshold, it may be determined that the potential solution satisfies the KKT optimality condition equations and is the global optimal solution.

At step 355 a power distribution is determined for each endpoint at each remote transceiver based on the potential solution. The power distribution determines the amount of amplification each remote transceiver is to use when transmitting wireless communications to each of the endpoints. In certain embodiments, the better (e.g., stronger, clearer, more efficient) a wireless signal is between a remote transceiver and an endpoint, the greater the amount of power the remote transceiver will use to communicate with the endpoint; conversely the worse a wireless signal is, the less power the remote transceiver will use to communicate with the endpoint. Thus, the power distribution may not be uniform among the endpoints and/or remote transceivers Some of the steps illustrated in FIG. 3A may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined, re-arranged or modified in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within distributed antenna system 100 such as endpoints, base stations and remote transceivers, these elements may be combined, rearranged or positioned in order to accommodate particular routing architectures or needs. In addition, any of these elements may be provided as separate external components to distributed antenna system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method of adjusting power distribution comprising:
   establishing a plurality of wireless connections with a plurality of endpoints via one or more of a plurality of remote transceivers;
   determining a plurality of candidates for a positive power gain, the candidates comprising a plurality of unique pairings, each pairing comprising a combination of one endpoint and one remote transceiver;
   identifying a subset of the plurality of candidates;
   determining whether the identified subset results in an optimum power distribution;
   determining a received power associated with each unique pairing of one endpoint and one remote transceiver; and
   generating a power matrix indicative of the determined plurality of candidates, the determined plurality of candidates based on the received power associated with each unique pairing of one endpoint and one remote transceiver;
   if the identified subset results in a less than optimum power distribution, identifying a different subset of candidates; and
   if the identified subset results in an optimum power distribution, computing a nonuniform power distribution based on the identified subset.

2. The method of claim 1, wherein generating the power matrix a first time comprises:
   identifying, for each remote transceiver, one endpoint of the plurality of endpoints having a highest received power at the respective remote transceiver; and
   identifying, for each unaccounted endpoint that was not identified as having a highest received power at any of the remote transceivers, one remote transceiver of the plurality of remote transceivers for which the received power from the unaccounted endpoint is highest.

3. The method of claim 1, further comprising:
   determining a potential solution to a linear equation using the power matrix;
   comparing the potential solution to the linear equation to a previous solution to the linear equation;
   upon the potential solution being an improvement over the previous solution, determining at least one error value based on the potential solution; and
   upon the at least one error value being less than a threshold value, determining a power distribution for each endpoint at each remote transceiver based on the potential solution.

4. The method of claim 3, wherein determining at least one error value based on the potential solution comprises applying each of a plurality of optimality conditions to the potential solution.

5. The method of claim 3, wherein determining the potential solution to the linear equation using the power matrix comprises:
- forming a square matrix comprising a plurality of rows, each of the plurality of rows based on a different one of the values of the power matrix;
- forming a column matrix comprising a single column of values, each value based on a different one of the values of the power matrix; and
- solving the linear equation based on the square matrix and the column matrix.

6. A system for adjusting power distribution comprising:
- an interface configured to establish a plurality of wireless connections with a plurality of endpoints via one or more of a plurality of remote transceivers;
- a processor coupled to the interface and configured to:
- determine a plurality of candidates for a positive power gain, the candidates comprising a plurality of unique pairings, each pairing comprising a combination of one endpoint and one remote transceiver;
- identify a subset of the plurality of candidates;
- determine whether the identified subset results in an optimum power distribution;
- determine a received power associated with each unique pairing of one endpoint and one remote transceiver; and
- generate a power matrix indicative of the determined plurality of candidates, the determined plurality of candidates based on the received power associated with each unique pairing of one endpoint and one remote transceiver; and
- if the identified subset results in a less than optimum power distribution, identify a different subset of candidates; and
- if the identified subset results in an optimum power distribution, compute a nonuniform power distribution based on the identified subset.

7. The system of claim 6, wherein the processor configured to generate the power matrix is further configured to, when generating the power matrix a first time:
- identify, for each remote transceiver, one endpoint of the plurality of endpoints having a highest received power at the respective remote transceiver; and
- identify, for each unaccounted endpoint that was not identified as having a highest received power at any of the remote transceivers, one remote transceiver of the plurality of remote transceivers for which the received power from the unaccounted endpoint is highest.

8. The system of claim 6, wherein the processor is further configured to:
- determine a potential solution to a linear equation using the power matrix;
- compare the potential solution to the linear equation to a previous solution to the linear equation;
- upon the potential solution being an improvement over the previous solution, determine at least one error value based on the potential solution; and
- upon the at least one error value being less than a threshold value, determine a power distribution for each endpoint at each remote transceiver based on the potential solution.

9. The system of claim 8, wherein the processor configured to determine at least one error value based on the potential solution is further configured to apply each of a plurality of optimality conditions to the potential solution.

10. The system of claim 8, wherein the processor configured to determine the potential solution to the linear equation using the power matrix is further configured to:
- form a square matrix comprising a plurality of rows, each of the plurality of rows based on a different one of the values of the power matrix;
- form a column matrix comprising a single column of values, each value based on a different one of the values of the power matrix; and
- solve the linear equation based on the square matrix and the column matrix.

11. One or more non-transitory computer-readable storage media embodying instructions which, when executed by a processor, cause the processor to perform the instructions, the instructions comprising:
- establish a plurality of wireless connections with a plurality of endpoints via one or more of a plurality of remote transceivers;
- determine a plurality of candidates for a positive power gain, the candidates comprising a plurality of unique pairings, each pairing comprising a combination of one endpoint and one remote transceiver;
- identify a subset of the plurality of candidates;
- determine whether the identified subset results in an optimum power distribution;
- determine a received power associated with each unique pairing of one endpoint and one remote transceiver; and
- generate a power matrix indicative of the determined plurality of candidates, the determined plurality of candidates based on the received power associated with each unique pairing of one endpoint and one remote transceiver; and
- if the identified subset results in a less than optimum power distribution, identify a different subset of candidates; and
- if the identified subset results in an optimum power distribution, compute a nonuniform power distribution based on the identified subset.

12. The media of claim 11, wherein the instructions configured to generate the power matrix a first time comprises instructions that when executed by the processor is configured:
- identify, for each remote transceiver, one endpoint of the plurality of endpoints having a highest received power at the respective remote transceiver; and
- identify, for each unaccounted endpoint that was not identified as having a highest received power at any of the remote transceivers, one remote transceiver of the plurality of remote transceivers for which the received power from the unaccounted endpoint is highest.

13. The media of claim 11, wherein the instructions when executed by the processor is further configured to:
- determine a potential solution to a linear equation using the power matrix;
- compare the potential solution to the linear equation to a previous solution to the linear equation;
- upon the potential solution being an improvement over the previous solution, determine at least one error value based on the potential solution; and
- upon the at least one error value being less than a threshold value, determine a power distribution for each endpoint at each remote transceiver based on the potential solution.

14. The media of claim 13, wherein the instructions that when executed by a processor is configured to determine at least one error value based on the potential solution is further configured to apply each of a plurality of optimality conditions to the potential solution.

15. The media of claim 13, wherein the instructions that when executed by a processor is configured to determine the potential solution to the linear equation using the power matrix is further configured to:
- form a square matrix comprising a plurality of rows, each of the plurality of rows based on a different one of the values of the power matrix;
- form a column matrix comprising a single column of values, each value based on a different one of the values of the power matrix; and
- solve the linear equation based on the square matrix and the column matrix.

\* \* \* \* \*